Nov. 21, 1933.        C. N. DAVIDSON ET AL        1,935,618
APPARATUS FOR TREATING CHEESES
Filed April 10, 1931
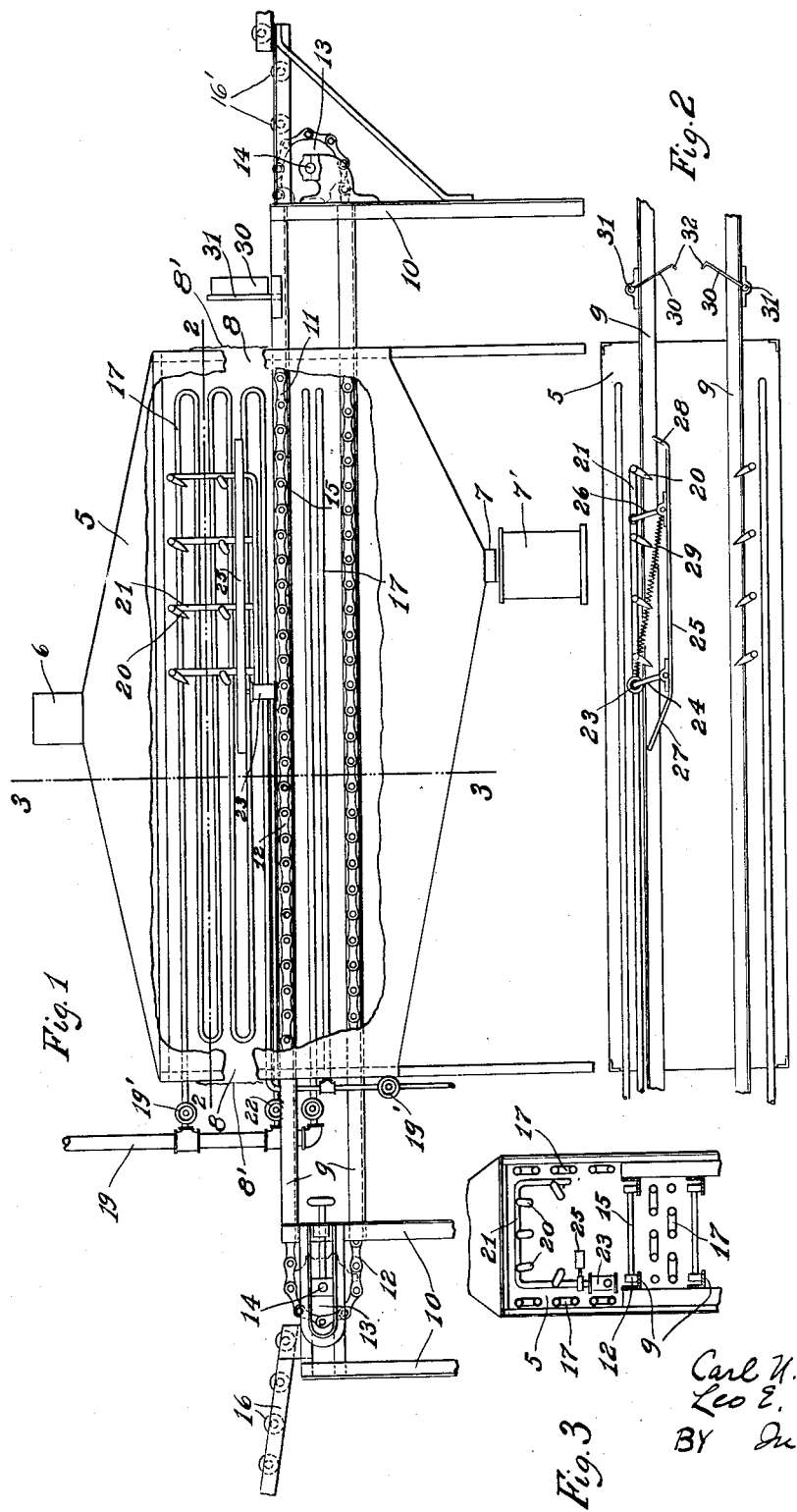
INVENTORS
Carl N. Davidson
Leo E. Steiner
BY Charles & French
ATTORNEYS Patented Nov. 21, 1933

1,935,618

UNITED STATES PATENT OFFICE 1,935,618

APPARATUS FOR TREATING CHEESES

Carl N. Davidson and Leo E. Steiner, Milwaukee, Wis., assignors, by mesne assignments, to Premier-Pabst Corporation, a corporation of Delaware Application April 10, 1931. Serial No. 529,101

2 Claims. (Cl. 99—2)

The invention relates to cheese making and more particularly to a method and apparatus for treating or preparing cheeses for use in the making of so-called processed cheese.

In the making of processed cheese, the previously made cheeses are cleaned and their bandages removed prior to their being cut up into smaller sections that may be readily handled and delivered to the grinders from which the ground cheese is taken to the pasteurizing equipment and there treated to produce the processed or pasteurized cheese product. Heretofore it has been the practice to remove the paraffin, rind and bandages from the cheese by operators who cut the same therefrom and this is a very laborious proceeding. The object of the present invention is to simplify and improve this initial step of the processed cheese process by subjecting the cheese to heat within a heated chamber and subjecting the cheese to the action of steam jets as it passes through said chamber to soften and melt the paraffin coating or outer surface of the cheese and thus permit the ready removal of the protective coatings on the cheese.

The invention further consists in the several features hereinafter set forth and more particularly defined by claims at the conclusion hereof.

In the drawing, Fig. 1 is a side elevation view of an apparatus embodying the invention and used for carrying out the method, parts being broken away;

Fig. 2 is a detail plan view of a part of the interior of the apparatus;

Fig. 3 is a detail vertical sectional view taken on the line 3—3 of Fig. 1.

Referring to the drawing, the numeral 5 designates a chamber having a ventilating or exhaust stack 6 at its top and a drain opening 7 at its bottom portion discharging into a receptacle 7' and having side openings 8 closed off by curtains or flexible elements 8' which are hung from the upper part of the openings and are free to be moved by the cheeses introduced into the chamber and form self closing doors for the same.

Horizontally disposed channel iron conveyor supports 9 are connected to and supported in spaced relation outside the chamber by upright frame members 10 and extend through the chamber, the upper of the supports 9 being disposed at the lower parts of the openings 8.

An endless conveyor 11 of usual construction has side chains 12 running in the supports 9 and over sprockets 13 mounted on shafts 14 supported in suitable bearings carried by the uprights 10, the pintles 15 of these chains being formed of rods which extend across the space between the chains 12 and thus form a flexible support for carrying the cheeses through the chamber 5 and one of the shafts 14 is driven by any suitable source of power.

A gravity roller conveyor 16 delivers the cheeses onto the upper run of the conveyor 11 by which they are slowly carried through said chamber and then delivered onto a delivery conveyor including the rollers 16'.

The chamber has its interior heated by a series of steam coils 17 disposed at the sides of said chamber and in the space between the upper and lower runs of the conveyor as shown in Figs. 1 and 3. These coils are connected to a header or steam supply pipe 19 and each of the coil sections may be controlled by a manually operable valve 19'.

In addition to the heat supplied by the coils 17, the interior of the chamber and also the cheese is heated by the delivery of live steam thereto through the jets or nozzles 20 directed toward the cheeses as they pass through the chamber. These nozzles are connected to distributor piping 21 which is connected to the supply pipe 19 and which may be controlled by a hand valve 22, it being noted that these nozzles are arranged in spaced series and that the nozzles of each series are arranged to direct their jets downwardly toward the conveyor from above and also inwardly from the sides thereof so that the cheeses, which are usually cylindrical in shape and placed with their ends facing the sides of the conveyor, are subjected to the action of the steam jets which play upon the sides and ends of the cheeses as they pass these jets. As the steam issuing from the jets 20 strikes the cheeses with considerable force this action aids in softening or loosening the coatings or coverings on the cheeses.

In order to conserve steam and also prevent too high a temperature existing in the chamber means are provided for turning on the steam as the cheese or cheeses pass the nozzles 20 comprising a valve 23 of the rotary type controlling the passage of steam from the supply line to the distributor piping for said nozzles, an operating lever 24 for said valve and a bar 25 pivotally connected to said lever at one end and to a pivotally mounted supporting link 26 at its other end and having inclined end portions 27 and 28, said bar 25 normally projecting out into the path of movement of the cheeses moving through the chamber on said conveyor so that these cheeses will engage and press this bar 25 outwardly and thus open the valve 23 against the resistance of a spring 29 which acts to move these parts to shut the valve and return the bar 25 to its normal position.

After the cheeses leave the chamber they pass between a pair of scraping devices or knives 30 which act principally to exert a scraping action against the ends of the cheese. For this purpose each of the knives 30 is mounted on a vertically disposed shaft 31 at the side of the conveyor, and these scrapers are made of spring metal so that they will normally be disposed inwardly in an inclined position across the path of the cheeses travelling along the conveyor as shown in Fig. 2 but will be flexed outwardly by a cheese as it moves between them and the inturned edges 32 of said scrapers will then be disposed in a position to scrape across the ends of the cheese.

From the foregoing it will be noted that by subjecting the cheeses to the action of heat in the heated chamber and also to the impinging action of jets of live steam that the outer coverings or coatings of the cheese are softened or loosened and it then becomes a relatively simple matter for the operators to remove the bandages on the cheese and clean them preparatory to their being sent to the grinders.

We desire it to be understood that this invention is not to be limited to any particular construction or arrangement of parts or to specific details except in so far as such limitations are included in the claims.

What we claim as our invention is:

1. In an apparatus for treating cheese, the combination of a chamber, means for heating the interior of said chamber, means for conveying cheeses through said chamber, means for directing jets of steam against the cheese during its passage through said chamber, and means in the path of the moving cheeses for scraping the ends thereof.

2. In an apparatus for treating cheese, the combination of a chamber, means for conveying cheeses through said chamber, means for directing jets of steam upon the cheeses as they pass through said chamber, and means controlled by the cheeses for controlling the steam supplied to said jets.

CARL N. DAVIDSON.
LEO E. STEINER.